UNITED STATES PATENT OFFICE.

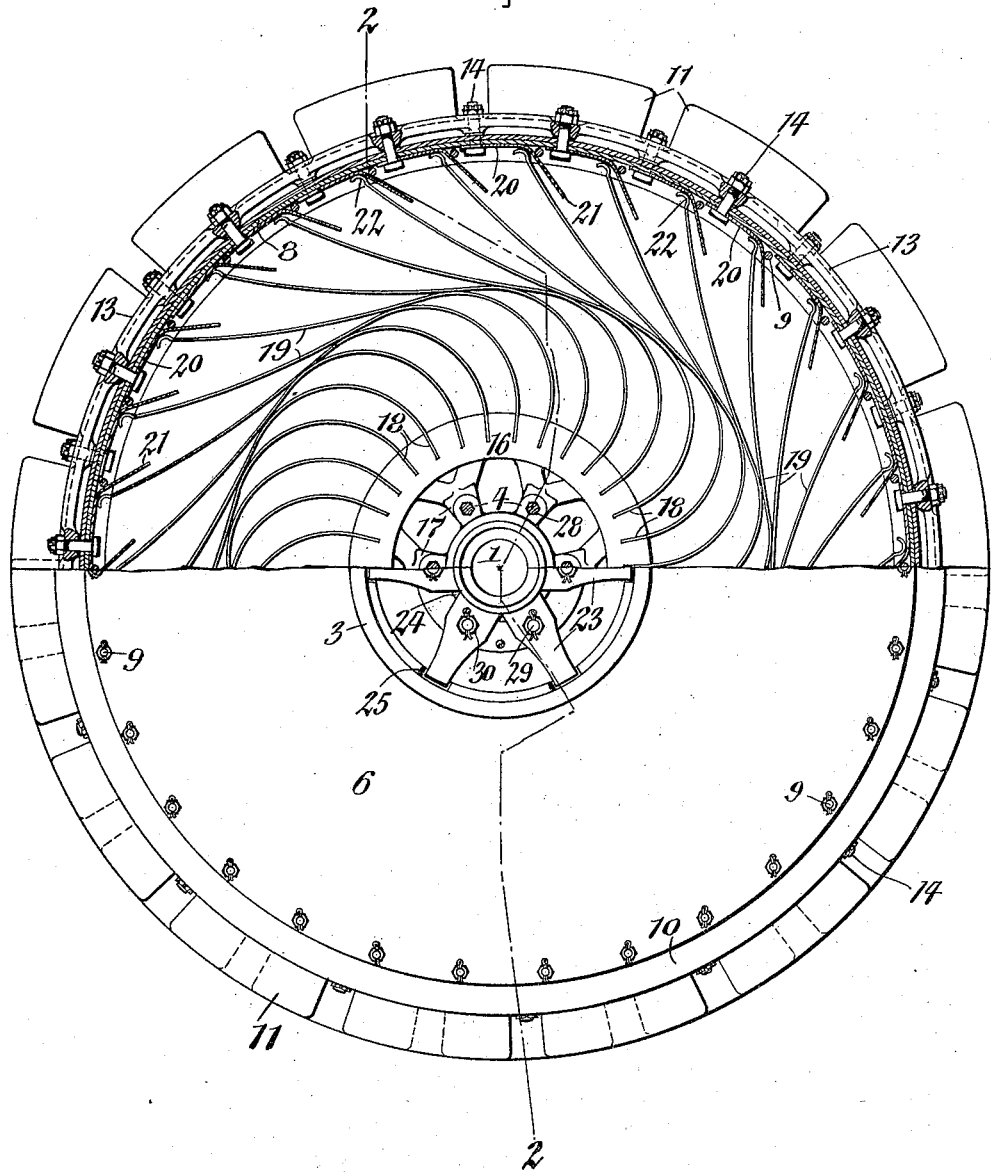

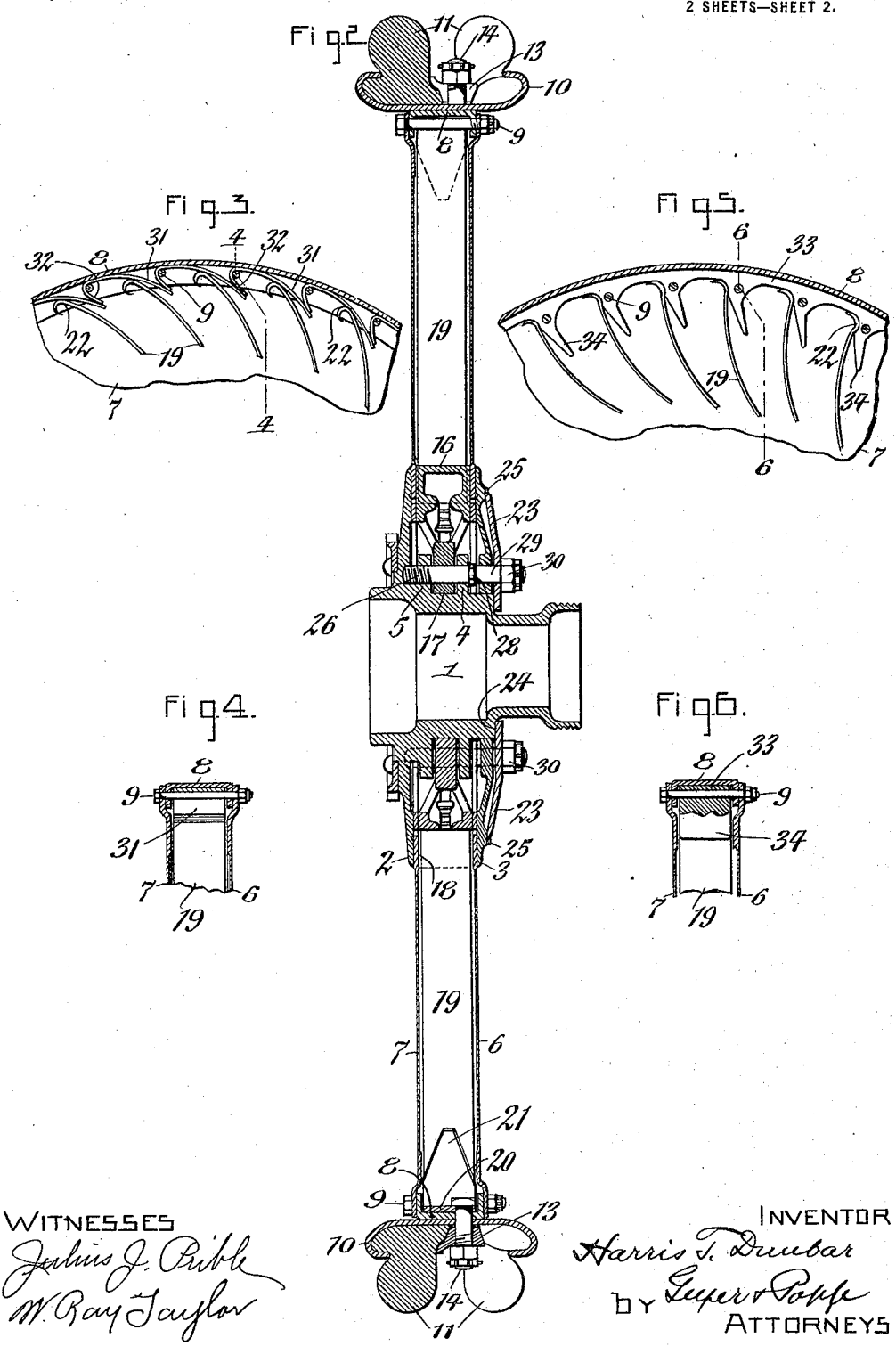

HARRIS T. DUNBAR, OF BUFFALO, NEW YORK.

SPRING-WHEEL.

1,178,502.

Specification of Letters Patent. Patented Apr. 11, 1916.

Application filed November 28, 1914. Serial No. 874,408.

*To all whom it may concern:*

Be it known that I, HARRIS T. DUNBAR, a citizen of the United States, residing at Buffalo, in the county of Erie and State of New York, have invented new and useful Improvements in Spring-Wheels, of which the following is a specification.

This invention relates to a wheel of that type in which the spokes are constructed in the form of spring leaves, so that the peripheral portion of the wheel is yieldingly connected with the hub thereof and thereby permits of cushioning the load which is supported upon the wheel through the medium of the axle. Wheels of this type are shown in prior patents granted to myself February 11, 1908, #878,714, and December 31, 1912, #1,048,666.

The object of the present invention is to simplify the construction of a wheel of this character and render the same not only less expensive and more durable, but also to permit of readily and conveniently assembling and dismembering the same for the purpose of inspection, adjustment and repairs.

In the accompanying drawings: Figure 1 is a side elevation, partly in section, of a wheel embodying one form of my improvements. Fig. 2 is a vertical section, on an enlarged scale, of my improved wheel taken in line 2—2, Fig. 1. Fig. 3 is a fragmentary sectional view of the peripheral portion of a wheel showing a modified construction of my improvements. Fig. 4 is a vertical section of the same taken in line 4—4, Fig. 3. Fig. 5 is a fragmentay longitudinal section of the peripheral portion of a wheel showing another modified construction of my improvements. Fig. 6 is a vertical section taken in line 6—6, Fig. 5.

Similar characters of reference indicate corresponding parts throughout the several views.

Referring to Figs. 1 and 2, 1 represents the tubular hub of the wheel which may be constructed in any suitable manner to fit the particular axle upon which the same is to be mounted. On its inner or rear end this hub is provided with a relatively fixed clamping disk 2 which is preferably formed integrally with the hub and on the front or outer end of this hub is mounted a front removable or detachable clamping disk 3 which is capable of moving axially toward and from the fixed rear clamping disk 2. Between the front and rear clamping disks the hub is provided on its periphery with annular rows of front and rear coupling lugs 4, 5 which are separated from each other by an intervening annular space.

6, 7 represent two disk-shaped side plates or webs which are provided with central openings for receiving the hub. The front one of these plates bears frictionally with its outer side against the inner side of the front clamping disk while the inner part of the rear side plate bears with its outer side against the inner side of the fixed rear clamping disk, as shown in Fig. 2. Between the outer edges of the side plates is arranged the annular felly 8 which is preferably constructed in the form of a channel iron having its concave side facing inwardly and secured to the side plates by means of horizontal bolts 9 passing through the peripheral portions of the side plates and the flanges of the channel-shaped felly. On the outer side of the felly is mounted the rim 10 on which the tire is mounted.

Although my improved wheel is capable of use in connection with wheel rims, tires and tire fasteners which may be variously constructed the same has been illustrated in the drawings in connection with a rim having inwardly turned clencher or hook-shaped flanges at its opposite longitudinal edges. On this rim is mounted a tire 11 composed of two annular rows of sections each of which has its base portion resting on the rim. The means for fastening the tire sections to the rim are also utilized in part for securing the rim to the felly and also to fasten parts of my improved wheel to the inner side of the felly as will presently appear. This fastening device, as shown in Figs. 1 and 2, comprises a plurality of clamping bars 13 which engage with the tire sections, and clamping bolts 14 passing radially through corresponding openings in the clamping bars, rim and felly.

Between the felly and the hub, yielding supporting means are provided which embody my invention and in their preferred form are constructed as follows: Surrounding the hub between the inner parts of the side plates is an annular spoke holder 16 the inner side or bore of which is provided with a plurality of coupling lugs 17 each of which is arranged between a pair of coupling lugs 4, 5, on the hub. The periphery of this spoke holder is provided with a plurality of spoke seats 18 which are preferably constructed in the form of radial slots opening at opposite sides and also at the periphery of the spoke holder.

19 represents a plurality of leaf spring spokes each of which has substantially the form of a sickle and connected at its inner end with the holder and operatively engaging at its outer end with the felly, while its intermediate part bears against the intermediate parts of adjacent spokes, whereby the several spokes support each other between the felly and hub and the load imposed upon the wheel is practically distributed over all of the spokes and the liability of breaking the same is therefore reduced to a minimum. Each of the spokes is preferably secured to the spoke holder by slipping its inner end into one of the spoke receiving slots or seats 18 in the periphery of the holder and the intermediate part thereof engages at one point with the adjacent spoke on one side thereof and at another point with the adjacent spoke on the opposite side thereof, as shown in Fig. 1. The outer ends of the several spokes operate upon the felly in such manner that they are free to slide circumferentially to a limited extent relatively to the felly but compel the latter to move positively with the spokes at the limit of such sliding movement so as to cause the felly and hub to turn together. The preferred means for accomplishing this purpose, shown in Figs. 1 and 2, comprise a plurality of abutments each of which has the form of a plate which consists of a base 20 secured circumferentially to the inner side of the felly by means of the adjacent bolt 14 which connects the felly, rim and clamping bars of the tire, and a guide arm 21 arranged at the front end of the base and projecting inwardly therefrom at an angle to the felly and base. The outer end of each spring spoke is preferably curled rearwardly to form a blunt bearing shoe 22 which is adapted to engage the inner surfaces of the base and guide arm of the companion abutment. During the backward rotation of the wheel the shoes at the outer ends of the spring spokes slide backwardly on the bases 20 of the abutments until they strike the heads at the inner ends of the fastening bolts 14 or similar obstruction after which the spokes and rim turn backwardly together, this backward movement of the spokes on the bases 20 being, however, resisted by the frictional engagement of these parts.

During the normal forward rotation of the wheel under a light load the power is transmitted from the axle to the rim through the medium of the spokes while the shoes at the outer end of the latter engage frictionally with the abutments at the junction of the bases and arms thereof. When, however, an increased driving strain is transmitted from the hub to the felly, the shoes at the outer ends of the spokes ride or slide forwardly and inwardly on the rear inclined faces of the guide arms, whereby the outer ends of the springs are deflected inwardly more or less and caused to increase their frictional grip against the abutment. By this means a reliable driving connection between the spokes and the rim is obtained while at the same time permitting of a limited play bewteen the spokes and the felly, so that the spokes can adapt themselves to variations in the strains or loads imposed upon the same. By providing abutments on the felly for engagement with the outer free ends of the spokes the latter are prevented from sliding entirely around the inner side of the felly when the tire encounters considerable resistance and thereby render the propulsion of the tire from the hub ineffective, as would be the case if the abutments were omitted.

The front and rear sides plates 6, 7 bear against the front and rear sides of the peripheral portion of the spoke holder and a rearward pressure is applied to the front clamping disk, so that the side plates are gripped between the front and rear clamping disk and the spoke holder for producing a frictional connection between these plates and the hub which additionally restrains the movement of the hub and felly relatively to each other in a radial direction. This frictional grip between the side plates, spoke holder and clamping plates is preferably effected by means which comprise a plurality of leaf-shaped tension springs 23 which are arranged in an annular row around the hub and front clamping disk and each of which rests at its inner end against an annular forwardly facing shoulder 24 on the front part of the hub while its outer end engages with a seat or notch 25 formed in the adjacent part of the front clamping disk.

Various means may be employed for connecting the spoke holder with the hub and retaining the front clamping disk and tension springs in place but it is preferable to employ for this purpose a plurality of ties which are arranged in an annular row around the hub. Each of these ties has its inner part 26 preferably constructed in the form of a screw which passes through one of the front lugs 4 of the hub and bears with its head 28 against the front side of this lug while its rear threaded end engages with a correspondingly threaded opening in the companion rear coupling lug 5 of the hub and receives on its intermediate part the companion coupling lug 17 of the spoke holder which last mentioned lug is capable of sliding on this screw to a limited extent in a direction parallel with the axis of the hub. The front part 29 of each of these ties is constructed in the form of a bolt which passes through corresponding openings in the inner portion of the front clamping disk and the companion tension spring 23 intermediate of the inner and outer ends of the latter and bears with its screw nut 30 against the outer side of the respective tension spring. By means of this construction each of the ties serves to connect the spoke holder slidingly with the hub and it also serves as a means for retaining the front clamping disks and the respective tension spring in place as well as permitting the tension of this spring to be increased or decreased as required.

By engaging the outer ends of the tension springs with notches or seats in the peripheral portion of the front clamping disk the latter is held against turning by the frictional engagement of the front side plate therewith.

Instead of constructing the abutment for the outer ends of the spokes in the manner shown in Figs. 1 and 2, the same result may be produced by the means which are shown in Figs. 3 and 4 and which comprises a plurality of hook-shaped plates which are arranged in an annular row adjacent to the inner side of the felly 8 and each of which is provided with a long inclined front arm 31 and a short inclined rear arm 32. Each of these hook-shaped abutments engages its front arm with the short rear arm of the next abutment immediately in front of the same and each is secured to the felly by engaging the inner side of the turn of this hook-shaped abutment with the adjacent bolt 9 which connects the flanges of the felly with the outer edges of the side plates. The corresponding outer end or shoe 22 of each of the spring spokes 19 engages with the front arm of the hook-shaped abutment and slides inwardly and outwardly more or less on this arm as the stress upon these spokes varies in accordance with the variation of the load to which the wheel is subjected.

Another form of abutment for the inner end of the spokes which will answer the purpose is shown in Figs. 5 and 6 and as there shown the abutment comprises an annular supporting band or ring 33 which is held against the inner side of the felly 8 by the bolts 9 which connect the felly with the side plates, and a plurality of guide arms 34 projecting inwardly at an angle from the ring 33 and each engaged on its rear side by the shoe 22 at the outer end of one of the spokes 8.

It will be apparent from the foregoing description of my improved wheel that the same is very durable and capable of supporting comparatively heavy loads with a resilient action which is not liable to injure or affect the stability of the wheel. Furthermore, the various parts can be produced at comparatively low cost and they can be readily assembled or dismembered when any access is desired to the interior of the wheel for various purposes.

I claim as my invention:

1. A wheel comprising a hub, a felly and supporting means interposed between said hub and felly comprising a plurality of leaf spring spokes connected at their inner ends with said hub, and a plurality of abutment plates each of which comprises a base secured to the inner side of the felly and having a circumferential bearing face and an inclined arm arranged at the front end of the base and provided on its rear side with a bearing face which is arranged at an angle to said felly and base, said bearing faces of the base and arm of said abutment plate being engaged by the outer ends of one of said spring spokes.

2. A wheel comprising a hub having lugs on its periphery, a felly provided on its inner side with a plurality of abutments, a spoke holder of annular form arranged around said hub and provided with a plurality of spoke seats, bolts detachably connecting said spoke holder with said lugs of the hub, and a plurality of leaf spring spokes each engaging its inner end with one of said seats and bearing at its outer end against one of said abutments.

3. A wheel comprising a hub having lugs on its periphery, a felly provided on its inner side with a plurality of abutments, a spoke holder of annular form arranged around said hub and provided on its inner side with a plurality of lugs and on its outer side with an annular row of outwardly opening seat slots, an annular row of leaf spring spokes each of which engages at its inner end in one of said slots while its outer end engages one of said abutments, and bolts connecting the lugs of the hub with those of the spoke holder.

4. A wheel comprising a hub, a felly, a spoke holder surrounding the hub, spokes mounted on said holder and engaging said felly, side plates connected with said felly and bearing against the front and rear sides of said spoke holder, a rear clamping disk fixed on the hub and engaging the rear side plate, a detachable front clamping disk mounted on the hub and engaging the front side disk, and ties connecting said hub, spoke holder and front clamping disk.

5. A wheel comprising a hub, a felly, a spoke holder surrounding the hub, spokes mounted on said holder and engaging said felly, side plates connected with said felly and bearing against the front and rear sides of said spoke holder, a rear clamping disk fixed on the hub and engaging the rear side plate, a detachable front clamping disk mounted on the hub and engaging the front side plate, leaf tension springs engaging the outer side of the front clamping disk, and ties connecting said hub, spoke holder, front clamping disk, and tension springs.

6. A wheel comprising a hub having a plurality of coupling lugs on its periphery, a spoke holder having a plurality of lugs engaging the lugs of the hub, a plurality of spring spokes engaging their inner ends with said spoke holder, a felly having abutments which are engaged by the outer ends of said spokes, front and rear side plates connected at their outer edges with said felly and engaging their inner edges with the front and rear sides of said spoke holder, a rear clamping disk fixed on the hub and engaging the rear side plate, a front clamping disk movable on the hub and engaging with the front side plate, leaf tension springs each engaging its opposite ends with the hub and with the front clamping disk, and a plurality of ties each comprising a rear part constructed in the form of a screw which is secured to one of the hub lugs and receives one of the spoke holder lugs, and a front part constructed in the form of a bolt the body of which receives the front clamping disk and one of the tension springs and bears with its screw nut against the outer side of the respective tension spring.

7. A wheel comprising a hub having a front shoulder, a spoke holder mounted on the hub, a felly, spring spokes interposed between said felly and spoke holder, side plates connected with said felly and bearing against opposite outer sides of the spoke holder, a fixed clamping disk arranged on the hub and bearing against the outer side of one of said side plate, a movable clamping disk mounted on the hub and bearing against the outer side of the other side plate and provided on its outer side with seats, a plurality of leaf tension springs each engaging at its inner end with said shoulder on the hub while its outer end engages with one of said seats on the movable clamping disk, and means for adjustably connecting each tension spring intermediate of its inner and outer ends with the hub.

Witness my hand this 23rd day of November, 1914.

HARRIS T. DUNBAR.

Witnesses:
THEO. L. POPP,
ANNA HEIGIS.

Copies of this patent may be obtained for five cents each, by addressing the "Commissioner of Patents, Washington, D. C."